(12) United States Patent
Finn

(10) Patent No.: US 8,471,175 B2
(45) Date of Patent: Jun. 25, 2013

(54) LASER BLANKING FROM COIL STRIP PROFILE CONVEYOR SYSTEM

(75) Inventor: Jay G. Finn, Napoleon, OH (US)

(73) Assignee: Lasercoil Technologies, LLC, Napoleon, OH (US)

( * ) Notice: Subject to any disclaimer, the term of this patent is extended or adjusted under 35 U.S.C. 154(b) by 677 days.

(21) Appl. No.: 12/690,418

(22) Filed: Jan. 20, 2010

(65) Prior Publication Data

US 2010/0181165 A1 Jul. 22, 2010

Related U.S. Application Data

(60) Provisional application No. 61/145,890, filed on Jan. 20, 2009, provisional application No. 61/255,648, filed on Oct. 28, 2009.

(51) Int. Cl.
B23K 26/14 (2006.01)
(52) U.S. Cl.
USPC .................................. 219/121.67; 219/121.82
(58) Field of Classification Search
CPC ......... B65G 49/00; B65G 49/02; B65G 49/025
USPC ............. 219/121.67, 121.68, 121.71, 121.82; 198/339.1, 341.01, 341.02, 341.08, 341.09; 228/47.1, 49.1; 83/155, 156, 732, 436.6
See application file for complete search history.

(56) References Cited

U.S. PATENT DOCUMENTS

| 4,718,541 | A | | 1/1988 | Wilding |
|---|---|---|---|---|
| 5,436,423 | A | | 7/1995 | Welty |
| 5,637,069 | A | * | 6/1997 | Klicpera et al. ............... 483/14 |
| 6,191,382 | B1 | | 2/2001 | Damikolas |
| 6,520,057 | B1 | | 2/2003 | Steadman |
| 6,563,081 | B2 | | 5/2003 | Pace |
| 7,148,446 | B2 | | 12/2006 | Harnisch et al. |
| 7,154,530 | B2 | | 12/2006 | Andrews et al. |
| 2002/0134209 | A1 | * | 9/2002 | Burman et al. ................... 83/39 |
| 2005/0217981 | A1 | * | 10/2005 | Peterson ........................ 198/812 |
| 2006/0118529 | A1 | * | 6/2006 | Aoki et al. ............... 219/121.67 |

FOREIGN PATENT DOCUMENTS

WO   WO93/23185 A1   11/1993

OTHER PUBLICATIONS

International Search Report for International Application No. PCT/US2010/021498, (Mar. 23, 2010).
Design for Laserfacturing, Charles Caristan (Air Liquide), Taylan Altan, Serhat Kaya (the Ohio State University), (Nov. 7-8, 2007), pp. 1-10; (Nov. 7-8, 2007).

(Continued)

Primary Examiner — Khiem D Nguyen
(74) Attorney, Agent, or Firm — Harness, Dickey & Pierce, P.L.C.

(57) ABSTRACT

A laser blanking system for cutting material stock includes a first series of conveyor lanes that include a plurality of support conveyors which are situated in parallel, generally spaced apart relationships. A second series of conveyor lanes is situated downstream from the first series. The second series includes a plurality of support conveyors situated in parallel, generally spaced apart relationships with respect to each other. The laser blanking system further includes a multiple-axis gantry system. The multiple-axis gantry includes a moveable transverse-axis component is supported by and moveable along a longitudinal-axis component that is situated adjacent to a longitudinal edge of the first and second series. A moveable laser head is supported by the transverse-axis component. A controller operatively controls movements of each one conveyor of the first and second lanes, the transverse-axis component, and the laser head as stock material is indexed downstream and supported by the system.

20 Claims, 8 Drawing Sheets

OTHER PUBLICATIONS

Laser Blanking: Keeping Up with Multi-Model Production Needs, Dr. J.C. Mombo-Caristan, www.sme.org/forming&fabricating (Aug. 2000) pp. 46-54;, (Aug. 2000).

Design With Lasers in Mind, Charles, Gulam Mohiuddin, Mariana Forrest, and Nasim Uddin, Industrial Laser Solutions, www.industrial-lasers.com (Jun. 2007) pp. 35-39, (Jun. 2007).

* cited by examiner

LASER BLANKING FROM COIL STRIP PROFILE CONVEYOR SYSTEM

CLAIM OF PRIORITY

The present application claims priority from Provisional Application No. 61/145,890, filed Jan. 20, 2009, and Provisional Application No. 61/255,648, filed Oct. 28, 2009, both of which are incorporated by reference herein.

BACKGROUND OF THE DISCLOSURE

The present disclosure is directed toward a conveyor including multiple support conveyor lanes and, more specifically, to a conveyor that includes adjustable narrow width conveyor lanes that extend to a first position to support stock material fed and retract to a second position to clear a path for a laser head cutting through the stock material. The lanes adjust between the first and second positions to accommodate a profile of a blank portion being cut as the laser head operates on the stock material.

Significant construction efforts, slow cutting speeds, and floor space requirements precluded the use of laser technology in certain applications, such as automotive manufacturing. However, recent advancements in both servo motion control and linear motors have enabled laser blanking to become a higher quality, efficient alternative to mechanical press blanking.

Existing press-based mechanical blanking systems perform material cutting operations on flat, stationary strips of material positioned underneath a press. A strip of material is fed downstream on the conveyor, which moves the strip along the conveyor until it is situated directly beneath the press. Movement of the conveyor is suspended until the press stamps out a blank from the strip material.

These press-based mechanical operations generally require a dedicated tool, in the form of a blanking press die, to stamp the configured blank from a coil strip. Initial investment costs for press-based mechanical systems are significant. For example, a blanking die customized for one cutting operation can cost hundreds of thousands of dollars. Furthermore, advancements in steel material strength has made the quality of a mechanically cut edge an issue when micro fractures that occur along the cut edges develop into splits during forming processes. More specifically, microfractures that form around the edge of a generally planar part can propagate into large cracks during the forming process when the planar part is constructed into an article having a three-dimensional shape.

The costs of press-based manufacturing are impacted by the advanced, higher strength materials: (1) higher yield and tensile strength requires higher tonnage presses; and, (2) faster dulling blades requires more frequent servicing. Therefore, the dramatic improvement in laser cutting speeds through variable material thicknesses is making laser blanking operations a preferred option, especially since laser cutting technology enables virtually unlimited types of contours to be cut in a blank. A further advantage associated with laser cutting is a reduction in scrap material.

The motion controller of the laser adjusts the laser with rapid motion of the focusing head such that it travels along a cut path line. Laser-cutting speeds and profiling can now accommodate both low and high volume applications with thicker materials. There is a need for laser systems that occupy minimal space for laser cutting operations.

Thus, there is a need for a laser blanking system which overcomes the above-mentioned deficiencies and others while providing better and more advantageous overall results.

SUMMARY OF THE DISCLOSURE

The present disclosure is directed toward a laser blanking system for cutting material stock. Specifically, the laser blanking system includes a first series of conveyor lanes that include a plurality of support conveyors which are situated in substantially parallel, generally spaced apart relationship with respect to each other. A second series of conveyor lanes is situated downstream from the first series. The second series includes a plurality of support conveyors situated in parallel, generally spaced apart relationships with respect to each other. The laser blanking system further includes a multiple-axis gantry system. The multiple-axis gantry includes a moveable transverse-axis component that is moveable along a longitudinal-axis component that is situated adjacent to a longitudinal edge of the first and second series. A moveable laser head is supported by the transverse-axis component. A controller operatively controls movements of each one conveyor of the first and second lanes, the transverse-axis component, and the laser head as stock material is indexed downstream and supported by the system.

Another aspect of the present disclosure is a laser blanking system for cutting a strip of material fed from a coil. The laser blanking system includes a first and second set of conveyors. Each set includes a plurality of parallel lanes of support conveyors supporting the strip. A belt moves forward in a recurring loop on each support conveyor of at least the second second set of conveyors. A laser cutter is suspended over the strip adjacent to where the first conveyor set abuts the second conveyor set. Each of the support conveyors is independently adjustable along a longitudinal axis of the system such that at least one of the support conveyors extends to support the strip and at least one of the support conveyors retracts to create a path opening for the laser to cut through the material.

In accordance with another aspect of the disclosure, a method is directed toward a laser blanking process. The method includes moving belts of a first set of substantially parallel support conveyors in a recurring loop at a first velocity while simultaneously moving belts of a second set of substantially parallel support conveyors in a continuous loop at a second velocity. The method further includes simultaneously extending a conveyor surface of at least one support conveyor at a third velocity while simultaneously retracting the conveyor surface of at least one other support conveyor at a fourth velocity. The method further includes simultaneously moving a laser head along a crane and transverse the first and second sets of conveyors at a fifth velocity, and simultaneously moving the crane along a gantry situated along a longitudinal edge portion of the first and second sets of conveyors at a sixth velocity. Any of the mentioned velocities can equal zero meters/second while associated feed stock material is fed from a coil at a seventh velocity greater than zero meters/second.

Still other aspects of the disclosure will become apparent upon a reading and understanding of the following detailed description.

DETAILED DESCRIPTION OF THE DISCLOSURE

For purposes of this disclosure, the terms "blank" and "developed blank" mean a final product or a finished part formed from a strip of coil stock material. A developed blank may comprise a simple profile, or it may include complex contours and holes formed there through. To achieve a final shape of the blank, the material removed from any holes is carried away from the strip by a scrap conveyor. This removed material is referred to herein as "cut-out" or "scrap".

As used herein for purposes of enablement, the term "perimeter" designates the profile shape portion being cut. A "perimeter portion" is not assigned solely to an entire outer perimeter of the developed blank or scrap part; rather, the term "perimeter portion" used herein refers to the partial or complete profile aimed to be cut by any one continuous generation of a focused laser beam. It is to be understood that generation of the laser beam is not continuous for some applications, wherein the laser head can activate to cut a first perimeter portion of a profile, the focused beam deactivates while the later-discussed conveyors adjust positions or the strip is indexed for a measured length, and then the laser head can reactivate to complete the perimeter of the profile and sever the blank from the strip.

In accordance with a preferred embodiment of the present disclosure, referring to FIGS. 1-14, a laser blanking profile conveyor system 10 (hereinafter synonymously referred to as the "conveyor system", the "laser cutting device", the "laser cutting system", and the "laser blanking system") for high speed cutting operations is shown. Specifically, the laser cutting operations are performed to cut and to separate blanks from a rapidly fed strip of stock material, which is fed from a coil processing line or equipment. The present disclosure is contemplated for use with various metal materials; however, there are various other types of material that may also be fed through the device, such as flat strips of other materials, such as, aluminum, plastic, plywood, epoxies, papers, and glass, etc., or on any other coiled material that can be cut by a laser.

The laser blanking device 10 can be made part of a multiple-station production line such that it works in conjunction with other auxiliary equipment, such as, for example, coil processing equipment, welding equipment, off-line robots, transfer and stacking equipment, and any other equipment that processes material before it enters or after it exits the conveyor system 10, etc.; namely, entry and exit equipment can be customized to a given production line.

Figure 1:
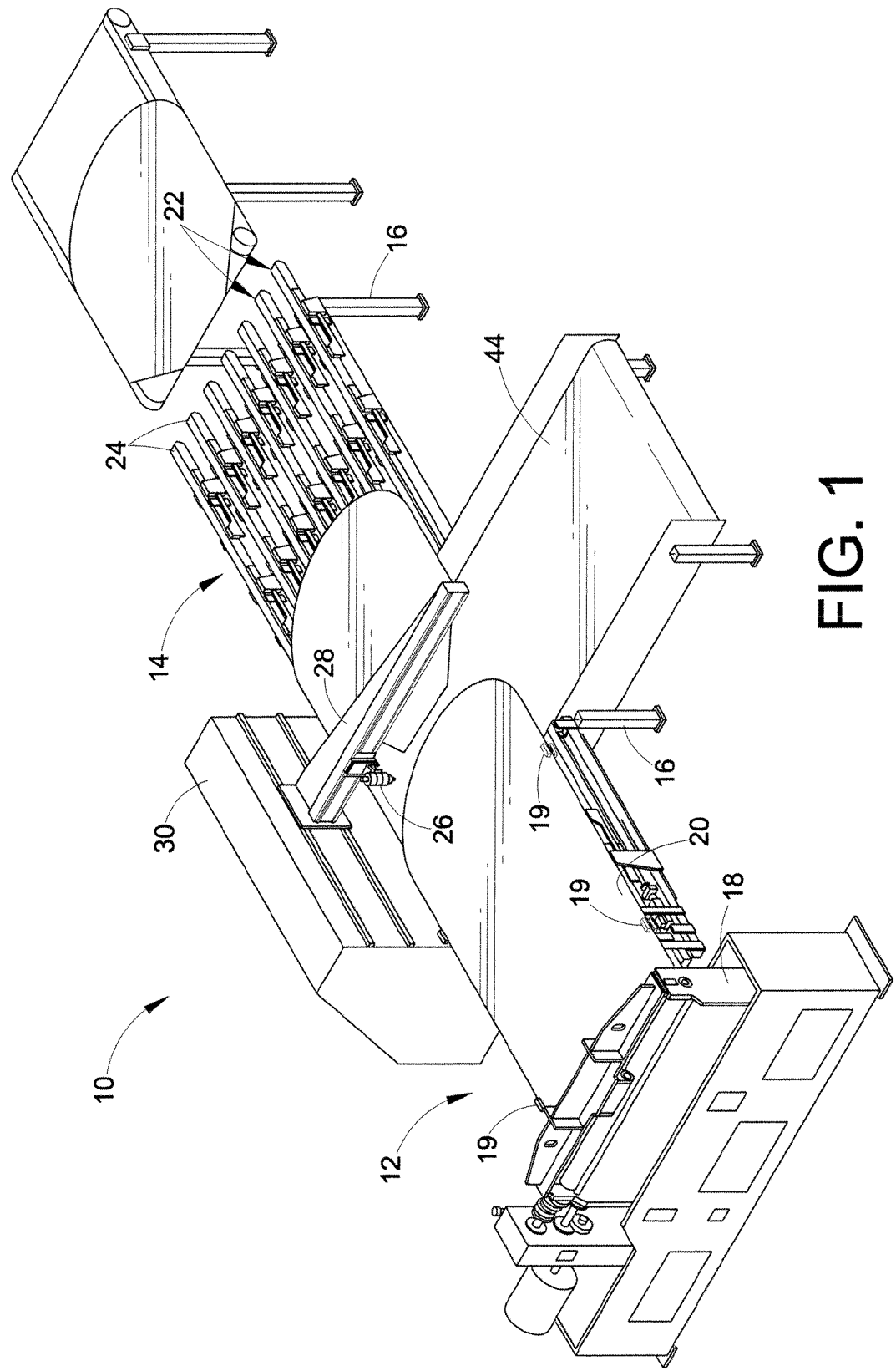
FIG. 1 is a perspective view of a laser blanking device according to an exemplary embodiment of the disclosure.

FIG. 1 illustrates the conveyor system 10 including a first series of conveyors 12 and a second series of conveyors 14. The first series of conveyors 12 is situated adjacent a first entry (i.e. upstream) side of the laser cutting station. The second series of conveyors 14 is situated adjacent a second or exit (i.e. downstream) side of the laser cutting station. Each series of conveyors 12, 14 is supported by a support frame (e.g., legs 16) that elevates the conveyors a height above the supporting floor or surface. The first and second series of conveyors 12, 14 are situated at a height in the same horizontal plane so that a strip of material unreeled from a coil stock can maintain a straightened profile after it enters an entry pinch roller assembly 18 that assists in a movement of the strip of stock material 20 downstream along the conveyor system 10. Series of conveyors 12, 14 at uneven heights can cause undesired bends in the material.

The pinch roller 18 pulls on the coil stock to feed the strip of material onto the first series of conveyors 12. A motor or other auxiliary coil processing equipment assists in rotating a reel of the coil stock so that the outermost layer of the strip can be continuously transported from the coil to the first series of conveyors 12. This auxiliary equipment more specifically actuates a mechanical rotation of the reel about which the coil stock is wound.

The pinch roll 18 is located adjacent or just immediate the upstream end of the first series of conveyors 12; however, it is contemplated that additional material guides 19 can be positioned along the series of conveyors 12, 14 at selected locations along the length of the system to ensure that the sheet of material is maintained straight. The material guides 19 may be situated along at least one longitudinal extent of the series of conveyors 12, 14 for guiding edge portions of the strip material 20. The pinch roller 18 can be mounted on and supported by the frame 16 or it can be included as a stand-alone apparatus situated in alignment with the conveyor support. A detailed description of the pinch roller is disclosed in commonly owned Ser. No. 61/145,890 filed on Jan. 20, 2009, the disclosure of which is fully incorporated herein.

The first series of conveyors 12 is situated upstream along the laser blanking system 10 while the second series of conveyors 14 is situated downstream along the system. Each series of conveyors 12, 14 includes a plurality of support conveyors 22. The support conveyors are preferably narrow in width. The preferred embodiment includes seven support conveyors 22 situated in a generally parallel relationship with each other. However, other numbers of support conveyors 22 in each series 12, 14 are contemplated by the disclosure. It is anticipated that one contemplated embodiment includes at least two support conveyors 22. The illustrated embodiment furthermore shows an equal number of support conveyors 22 on both the first and second series 12, 14. In an alternate embodiment, the number of support conveyors 22 in the first series 12 is unequal to the number of support conveyors 22 in the second series 14.

The preferred embodiment includes adjacent support conveyors 22 positioned in generally evenly spaced apart relationship to each other. However, it is contemplated that in an alternate embodiment adjacent support conveyors 22 can be positioned at unequal spaces apart from each other. In one embodiment, the space between each support conveyor 22 can be adjustable. Each one support conveyor 22 included in a series of conveyors 12, 14 in the illustrated embodiment is equal in width to the other support conveyors 22 in the series 12, 14; however, embodiments are also contemplated wherein at least one support conveyor 22 included in a series 12, 14 has a width unequal to the width of another conveyors 22 in the series 12, 14.

The laser blanking system 10 can include a modular set-up, wherein a second set of first and second series of conveyors may be placed adjacent to the first set of first and second series of conveyors to an output of the production run. The conveyors selected can be based on the width, space, and the numbers of conveyors needed for a select sheet material having an overall width variable and the regions of the sheet material subjected to cutting. For example, at least a third series of conveyors (not shown) can be placed downstream from the second series of conveyors 12.

The first and second series of conveyors 12, 14 are positioned within the laser blanking system 10 such that the support conveyors 22 extend along a longitudinal axis of the system. The pinch rollers 18 extend perpendicularly to the support conveyors 22 and, more specifically, the pinch rollers 18 extend across a width (or lateral extent) of the support conveyors 22 (i.e., series 12 and optionally 14). In one embodiment, each support conveyor 22 forming the second series of conveyors 12, 14 includes a conveyor belt 24 that moves in a recurring or continuous forward loop. This conveyor belt 24 urges a parted blank from the strip 20 downstream along the second series of conveyors 14 to associated stacking equipment (not shown). The strip 20 is indexed in a forward direction and/or downstream the first series of support conveyor 12 by the pinch rollers 18. In another embodiment, each support conveyor 22 forming both the first and the second series of conveyors 12, 14 includes a conveyor belt 24 that moves in a recurring or continuous forward loop. This conveyor belt 24 urges a parted blank from the strip 20 downstream the second series of conveyors 14 to associated stacking equipment (not shown). The conveyor belt 24 further assists the pinch rollers 18 in urging the strip 20 in a forward direction and/or downstream the first series of support conveyor 12. Each one belt 24 in a series 12, 14 is operatively associated to a common drive such that they all move at equal velocities. This simultaneous movement forward is achieved by at least one pulley of the support conveyor 22 being connected to a common drive. However, each one support conveyor 22 includes at least a second pulley that is not connected to the common drive. Therefore, forward extension and rearward retraction of a support conveyor 22 is independent from other support conveyors 22 in the series 12, 14.

The first series of conveyors 12 is situated immediately downstream from the pinch rollers 18. This first series of conveyors 12 moves the generally straightened strip of stock material 20 toward a cutting mechanism (laser 26). The laser blanking device 10 is capable of utilizing any of a variety of commonly known lasers, such as remote laser optics, fiber lasers, thin-disk lasers, etc, or any other laser capable of cutting at a rate that can sustain the velocity of the support conveyors 22. Utilizing existing laser technology, it is contemplated that the conveyor system 10 is capable of moving the strip of material 20 at a minimum of about 40-80 meters per minute.

The present laser blanking profile conveyor system 10 is capable of rapidly cutting a profile shape in the strip 20 of material by means of a multiple-axis gantry system. Components of the gantry system provide for a focus beam of a laser head 26 to contact and/or cut through the two-dimensional strip material 20 in both the longitudinal axis and the lateral axis of the strip 20. A laser head 26 is suspended at a height above the sheet material by means of a first transverse-axis component 28 (hereinafter synonymously referred to as "robot" or "gimbal"). The first transverse-axis component 28 is situated in a generally transverse relationship to the support conveyors 22 such that it extends across the combined widths of all support conveyors 22. More specifically, the transverse-axis component 28 is similar to a cantilevered beam that is suspended a height above the support conveyors 22. The laser head 26 generates a focus beam on the strip of stock material 20 to cut a perimeter portion as it moves along the transverse-axis component 28. The laser head 26 is capable of reciprocal motion along a longitudinal extent of the crane transverse-axis component 28. More specifically, the laser head 26 moves along the cantilevered beam 28 to achieve cuts generally across the strip material 20. Therefore, the laser head 26 is capable of moving in a transversely along a width of the stock material 20 to make lateral cuts in the stock material.

The transverse-axis 28 projects outwardly from a longitudinal-axis component 30, which is illustrated as being a generally stationary support structure including a channel for moveably mounting the transverse-axis component 28. The transverse-axis component 28 is shown to extend across an entire width of the first and second series of conveyors 12, 14. Alternatively, the transverse-axis component 28 can extend across only a portion of the width of the conveyor system 10. The longitudinal-axis component 30 is illustrated as being situated in proximity to an edge (or side) portion of the laser blanking system 10; however, the longitudinal-axis component 30 can extend along the entire longitudinal side of the system 10. The longitudinal-axis component 30 is situated adjacent to the longitudinal edges of the first series 12 and the second series 14. More specifically, the longitudinal-axis component 30 is situated in proximity to a downstream end of the first series 12 and an upstream end of the second series 14. The transverse-axis component 28 is capable of reciprocating movement along at least a limited length portion of the longitudinal-axis component 30 such that it moves across an entire surface region situated above the adjacent distal ends of the first and second series 12, 14.

The laser head 26 is capable of reciprocating movement along the transverse axis of the transverse-axis component 28. The transverse-axis component 28 is capable of reciprocating movement along the longitudinal axis of the longitudinal-axis component 30. The laser itself is further capable of vertical movement along a third (vertical) axis as it lifts and lowers in relation to the support conveyors 22. A controller (not shown) synchronizes movements in both (or all three) axes so that customized curvilinear cuts can be made in the stock material 20. It is anticipated, for example, that the transverse-axis component 28 (and the laser 26) is capable of moving at velocities up to at least twice as fast (i.e., 100 meters/minute) as the velocity that the conveyors 12, 14 are moving. Similarly, the laser head 26 is capable of moving along the transverse-axis component 28 at rapid velocities along either horizontal and/or vertical axes. There is no specific limitation made herein to a maximum velocity of movement for any of the conveyor belts 24, the transverse-axis component 28, the laser head 26, and the pinch rollers 18; rather, the disclosure herein is capable of being utilized with different other technologies and various speeds of movement.

One feature associated with the present disclosure is that each of the support conveyors 22 is moveable to match a profile of the blank being cut. More specifically, movement for one support conveyor 22 of a series 12, 14 is independent of the other support conveyors 22 of the series 12, 14. The belts 24 of the support conveyors 22 move the strip material 20 in a downstream direction along the laser cutting system 10; however, the support conveyor structures themselves act as a support to maintain a generally planar, straightened shape of the stock material. A top surface of the support conveyors 22 generally abuts an undersurface of the strip material 20.

The support conveyors 22 can adjust to clear a path or opening for the laser beam. More specifically, a support conveyor 22 retracts to remove support of a region of the strip material 20 when the laser head 26 makes a cut in that region of the strip. If an aperture is formed in the material 20, which will be included in a later-severed blank, the support conveyors 22 all situated within a support region of the aperture retract so that the scrap can fall below to a scrap conveyor 44 situated underneath distal ends of the first and second series 12, 14.

Figure 2:
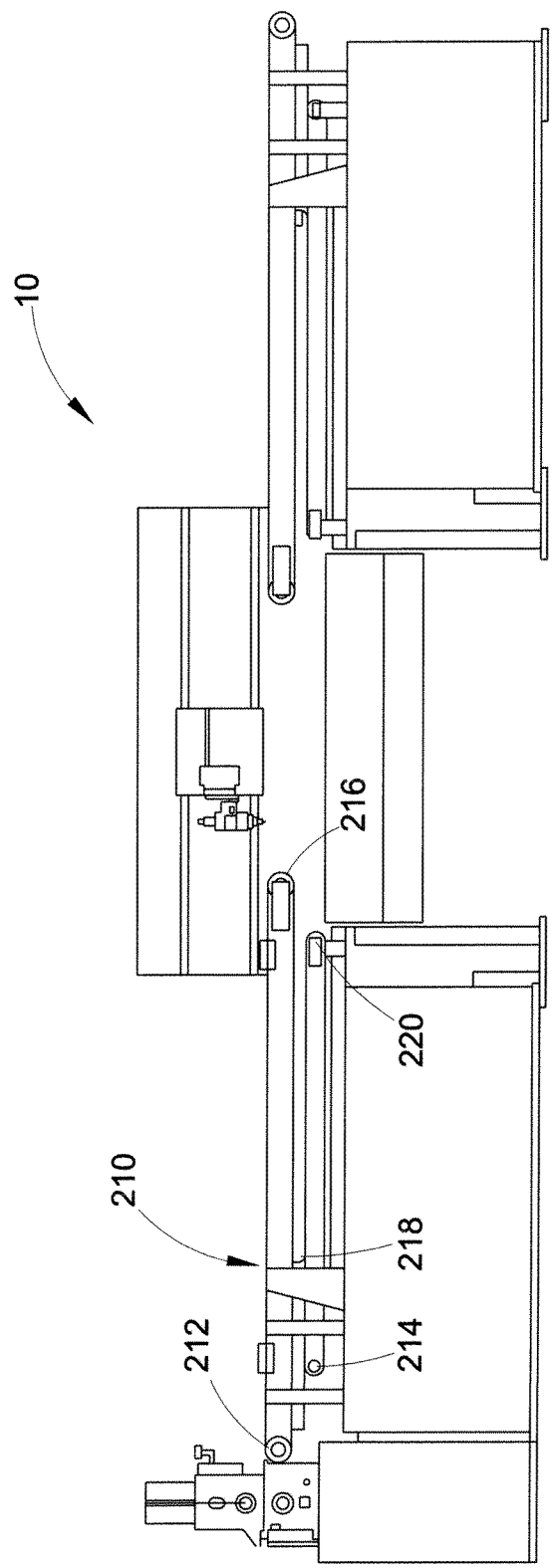
FIG. 2 is side view of the laser blanking device shown in FIG. 1.

The controller operates to activate adjustments of each of the support conveyors 22 such that they continuously or intermittently move to match the profile portion of the blank or cut-out being formed. FIG. 2 illustrates a side view of the laser blanking device 10. Adjustments are achieved by means of a serpentine belt configuration 200. An overall conveying distance or length of the conveyor surface 210 extends and retracts by means of an assembly of drive rollers 212-220 while an overall length of the continuous belt 24 remains constant. Any known serpentine conveyor assembly can be utilized in the present laser blanking device 10 to adjust the conveying distance of the support conveyors 10. Furthermore, the means for adjustment is not limited herein to a serpentine conveyor assembly; rather, any means capable of adjusting a longitudinal extent of a conveyor surface 210 can be utilized.

Figure 3:
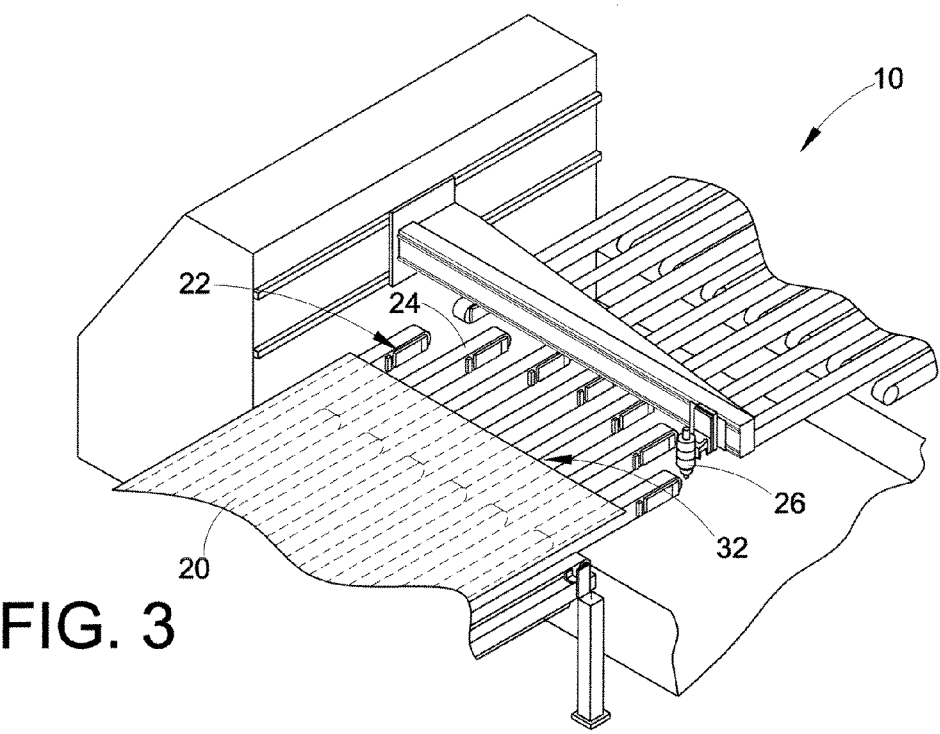
FIGS. 3-6 is a sequence illustrating a first profile portion cut for forming a blank from a strip of material on the laser blanking device of FIGS. 1 and 2.
Figure 4:
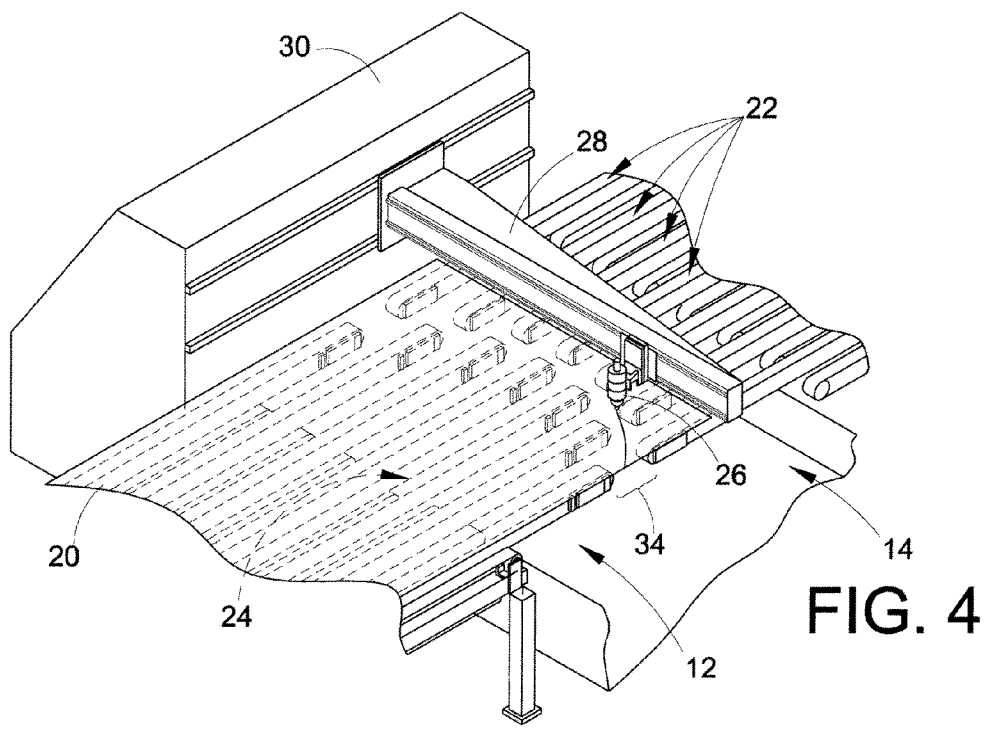

FIGS. 3-14 best illustrate a description of a blank-forming procedure utilizing the presently disclosed laser blanking system 10. These figures include a plurality of still-shots taken from the procedure. FIG. 3 illustrates a strip of stock material 20 moving downstream the conveyor system 10. The belts 24 of several parallel, narrow width support conveyors 22 (of the first conveyor series 12) move at equal velocities to move the stock material 20 supported thereon downstream along the conveyor system. However, the support conveyors 22 of the first series 12 does not require belts 24 to index the material 20 downstream the system 10. The pinch roller 18 will urge the material 20 downstream toward the multiple-axis gantry system. The support conveyors 22 of both the first and second conveyor series 12, 14 adjust into positions that will accommodate a (later described) first cut by the laser head 26 into the strip 20. As can be seen in the illustration, the noses (i.e., downstream ends) of the support conveyors 22 of the first series 12 terminate at different points because the first cut to be made into the strip 20 for the example blank will not be linear. FIG. 4 illustrates the blanking process when the strip of material 20 reaches a position situated directly underneath the laser head 26. The distal end of the strip of material 20 is generally moved to a position that rests on at least an upstream longitudinal length portion of the support conveyors 22 of the second series 12.

A gap(s) 34 formed between adjacent downstream and upstream ends of support conveyors 22 forming the first and second series 12, 14 clear a path or opening for the cut. Generally, the path can be in a shape of the total profile portion being cut with a laser beam. Alternatively, only a single region or gap between one pair of adjacent support conveyors 22 can form a path.

Figure 5:
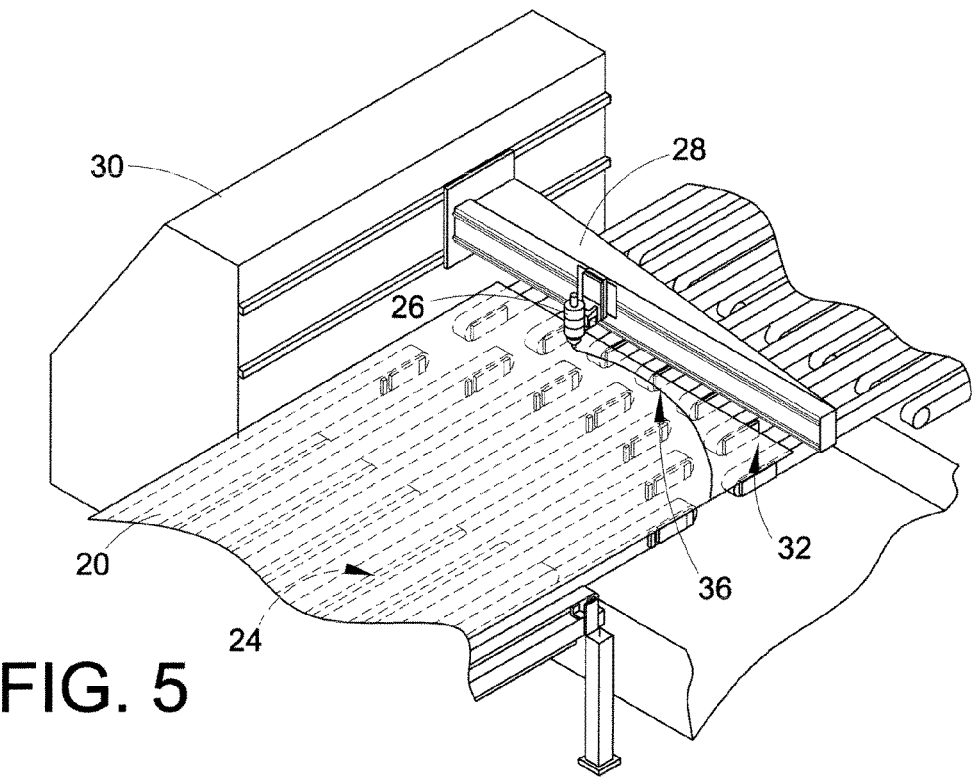
Figure 6:
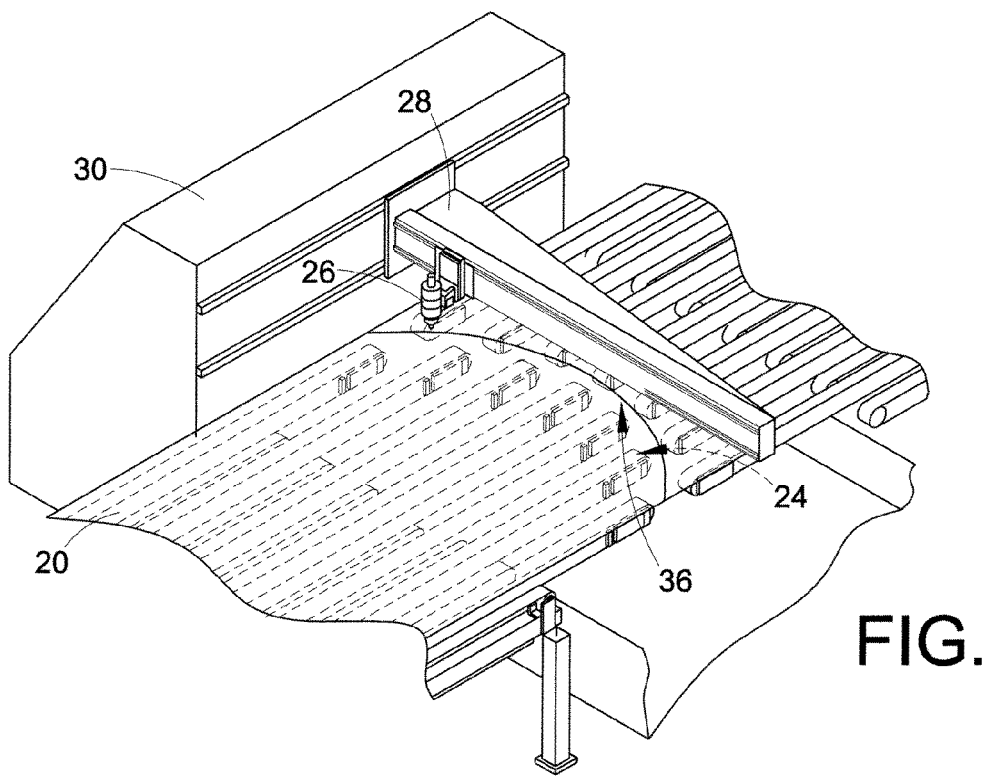

FIGS. 4 to 6 show the laser 26 moving along the transverse-axis component 28 such that the cut can be made across a width of the material strip 20. The laser 26 is more specifically moving from an outer end of the transverse-axis component 26 toward the longitudinal-axis component 30. Furthermore, the transverse-axis component 28 is simultaneously moving along a longitudinal extent of the longitudinal-axis component 30 to achieve the curvilinear profile of the cut 36.

Figure 7:
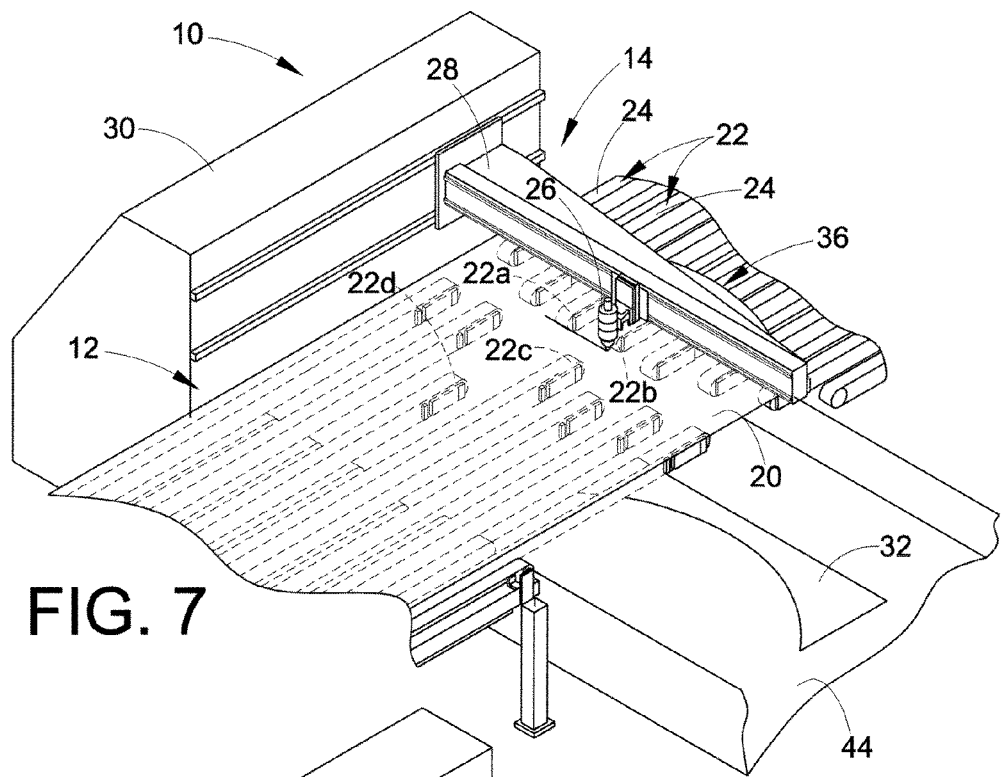
FIGS. 7-10 is a sequence illustrating a second profile portion cut for forming a cut-out in the blank; and, FIGS. 11-14 is a sequence illustrating a third profile portion cut for completing the blank and severing the blank from the strip of material.

FIG. 6 shows the laser 26 completing the first profile cut 36. In the process embodiment shown in FIGS. 3-6, the movements of the belts 24 are suspended throughout the first profile cut. In other words, the belts 24 (and the pinch roller 18) cease forward movement during the duration that the laser 26 and the transverse-axis component 28 simultaneously move to achieve the complete first cut. In other contemplated embodiments, however, movements of the belts 24 can be continuous such that the laser 26 and the crane 28 move and make cuts in the strip 20 simultaneously to the strip moving forward beneath them. As can be seen in FIG. 7, the first profile portion cut 36 extends across an entire width of the strip of material 20. Therefore, the front end 32 of the material 20 is severed from the strip. Although not shown in the present illustrated process, the support conveyors 22 of the second series 14 adjust, i.e., retract downstream, such that the severed strip can fall downward to the scrap conveyor 44, which in turn carries the severed scrap material away.

FIG. 7 illustrates the first profile portion cut 36 shown as an outer perimeter of a blank. This arcuate perimeter portion is the new front end of the strip of material 20. FIGS. 7-10 illustrate a second profile portion cut being made for the blank. This profile portion includes an aperture cut-out that is formed inside an outer perimeter of the resulting blank. Prior to the cutting of the second profile portion, the pinch roller 18 and the belts 24 of (optionally the first) and second conveyor series 12, 14 activate to move the strip of material 20 downstream an indexed length on the conveyor system 10 until the region for the aperture cut-out is situated directly beneath the transverse-axis component 28. Either simultaneous to the movement of the belts 24 or subsequent to movement of the belts 24, the individual support conveyors 22 of the first and second series 12, 14 adjust in independent lengths to accommodate a path for the second cut. More specifically, FIG. 7 illustrates that the strip 20 extends a distance to have at least a portion of the strip positioned on a longitudinal portion of the support conveyors 22 of the second series 14 such that the aperture can be formed in the second profile cut.

Figure 8:
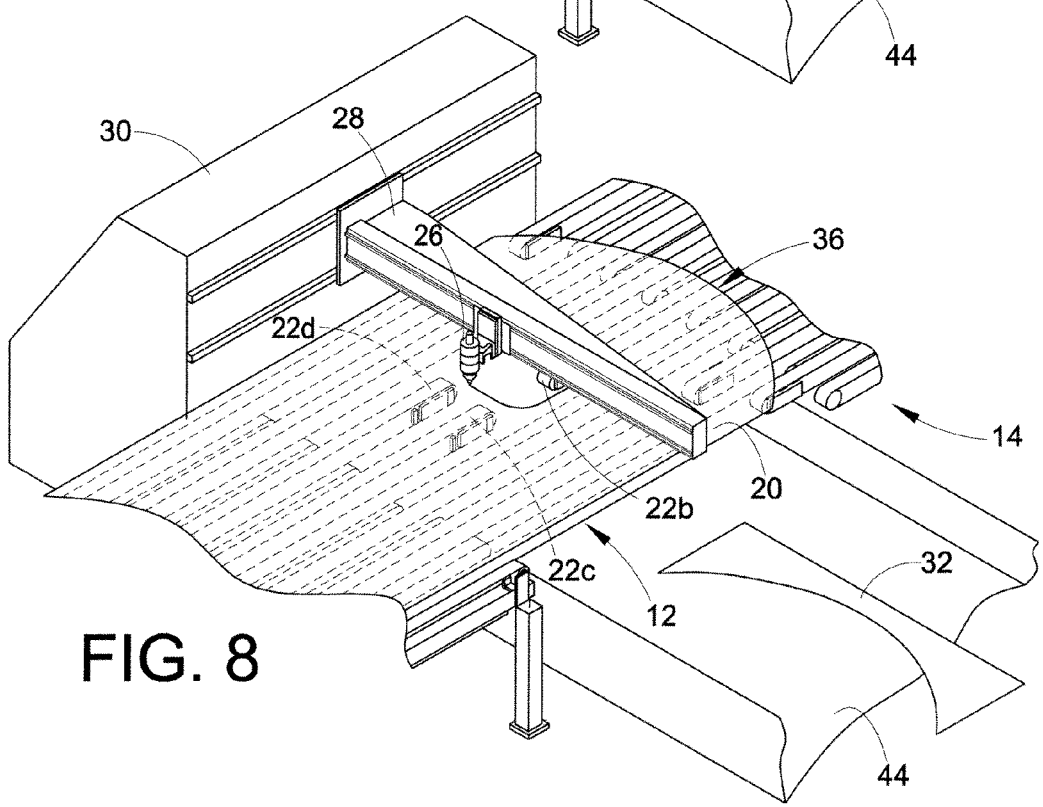

The support conveyors 22 of the first and second conveyor series 12, 14 situated in a region of the to-be-formed aperture retract to make a path for the laser beam to perform cutting. In particular, FIG. 7 illustrates the support conveyors 22a, 22b retracted so that a first outer perimeter side of a square-shaped aperture is cut. FIG. 8 illustrates that support conveyor 22b extends to continue supporting the strip material 20 immediately after the laser beam exits the nose region. Simultaneously, a support conveyor 22c situated adjacent to support conveyor 22b on the first series 12 retracts to make a path for the laser head 26 to focus the cut at an opposite perimeter side of the square-shaped aperture. Support conveyor 22d is retracted to clear the path for the laser beam as the laser 26 travels inward the extent of the transverse-axis component 28 toward the longitudinal-axis component 30.

Figure 9:
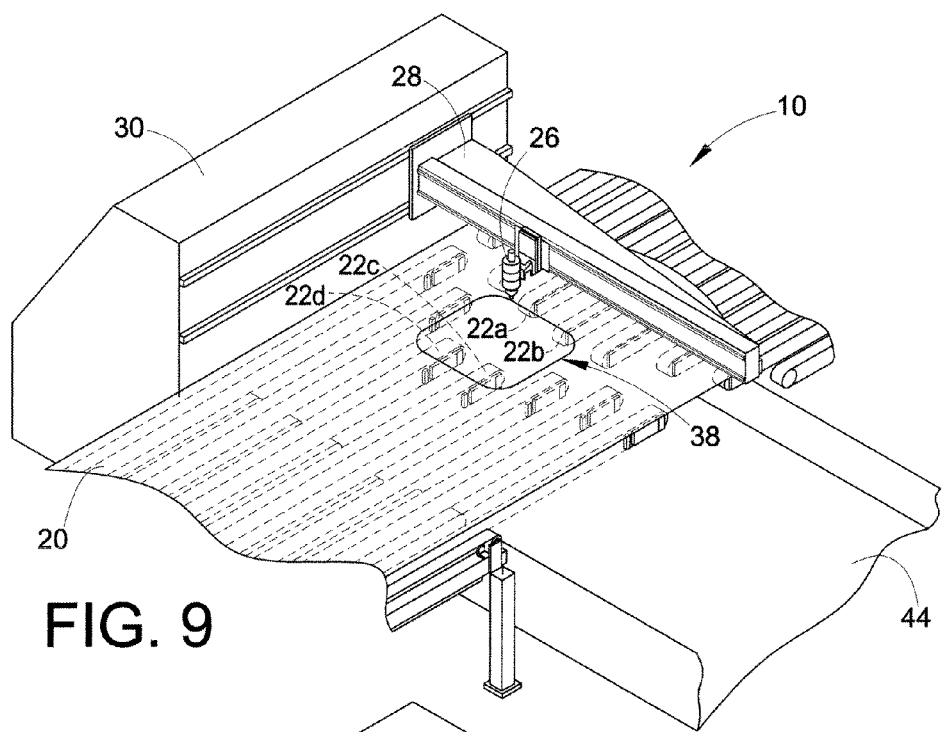

FIG. 9 illustrates completion of the second cut, wherein the laser beam cut continues as the transverse-axis component 28 moves upstream along the extent of the supporting longitudinal-axis component 30. The complete cut forms the square-shaped aperture 38, which is shown in FIG. 9 to be continually supported within the strip material 20 by the noses of support conveyors 22a-d. Although not illustrated, these support conveyors 22a-d eventually retract to allow for the square-shaped cut-out 38 to be separated from the conveyor assembly 10 to drop downwardly onto the scrap conveyor 44.

Figure 10:
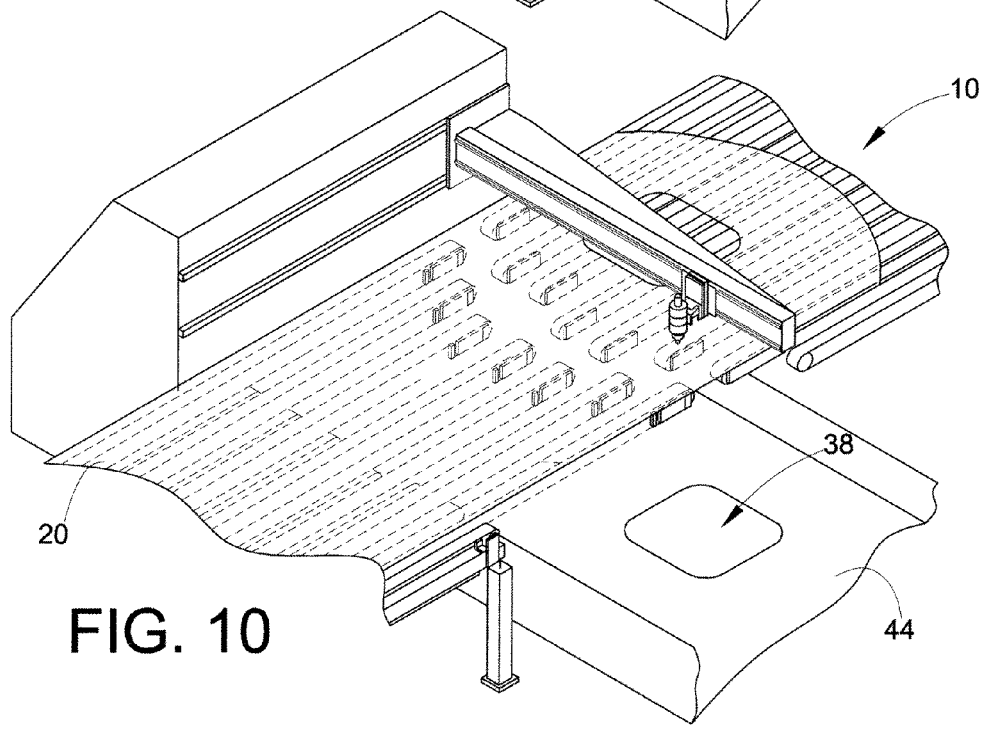

FIG. 10 illustrates a belt of the scrap conveyor 44 carrying the cut-out 38 away as the strip is advanced downstream the conveyor system 10.

Figure 11:
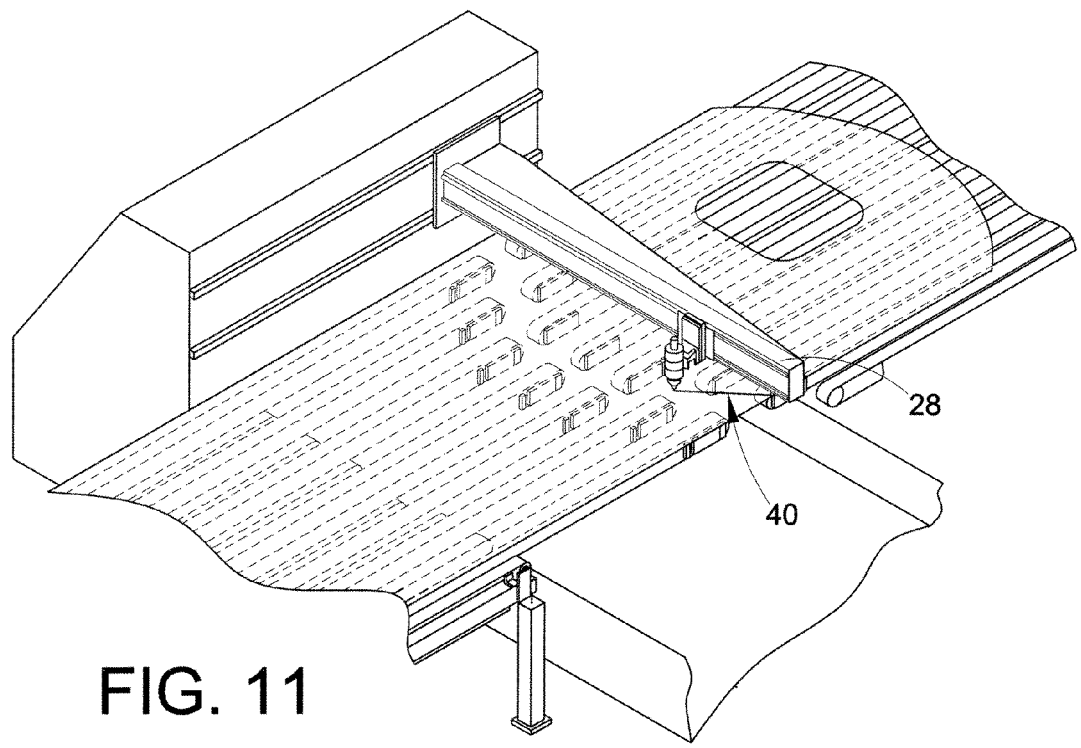

FIGS. 11-14 illustrate a third cut 40 formed in the laser blanking process. The third cut 40 in the described example completes the developed blank. As is shown in FIG. 11, the belts 24 of the support conveyors 22 move at equal velocities to advance the strip of material 20 downstream along the conveyor system 10 such that the third cut can be made in the blank. Before an initial portion of the third cut 40 is made, the support conveyors 22 retract or extend the conveyor surfaces to clear a path for the final cut.

In one embodiment, all of the support conveyors 22 can adjust simultaneously such that the entire path is made ready for the complete third cut 40 before the laser 26 generates the beam. In another embodiment, individual support conveyors 22 can adjust in sequence such that only a portion of the immediate path is made ready for that portion of the complete third cut 40 in the immediate region of the laser beam. As the laser 26 travels along the crane 28, the support conveyors 22 in the immediate and proximate regions beneath the laser adjust while adjustment of the remaining support conveyors 22 is delayed until the laser beam approaches their respective regions.

FIG. 11 illustrates an initial region of the third cut 40 to be cut by the laser. The laser is shown to initiate the third cut 40 from the outside end of the transverse-axis component 28 situated farthest from the longitudinal-axis component 30; however, the cut can be initiated from various locations. For example, the cut can initiate at the opposing connecting end of the transverse-axis 28. The cut can also initiate in a middle portion of the strip.

Figure 12:
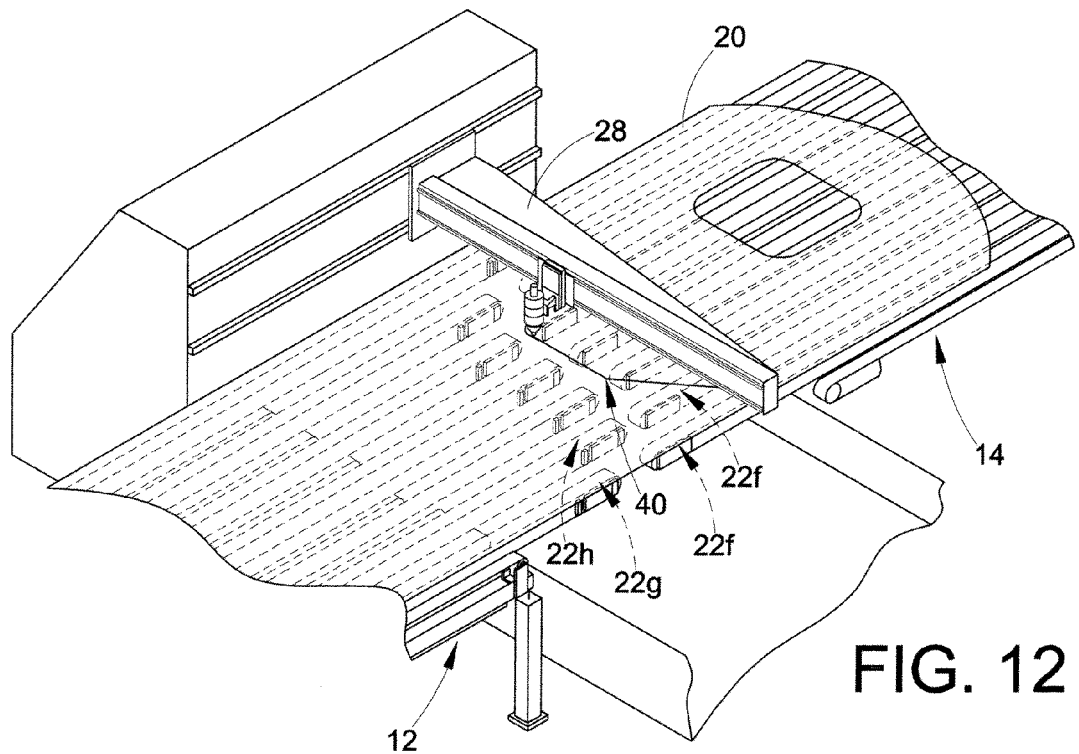

FIG. 12 is illustrative of a continuation of the third cut 40 being made. Once the laser beam moves beyond noses of the outermost support conveyors 22e, 22f of the second conveyor series 14, the support conveyors extend their conveyor surfaces to support the strip of material 20. Simultaneously, the adjacent outermost support conveyors 22g, 22h of the first series 12 retract. Therefore, support conveyors 22 of the first and second conveyor series 12, 14 can adjust and be positioned in the same regions; however, no adjacent support conveyors are coincident or situated in the shared region at the same time.

Figure 13:
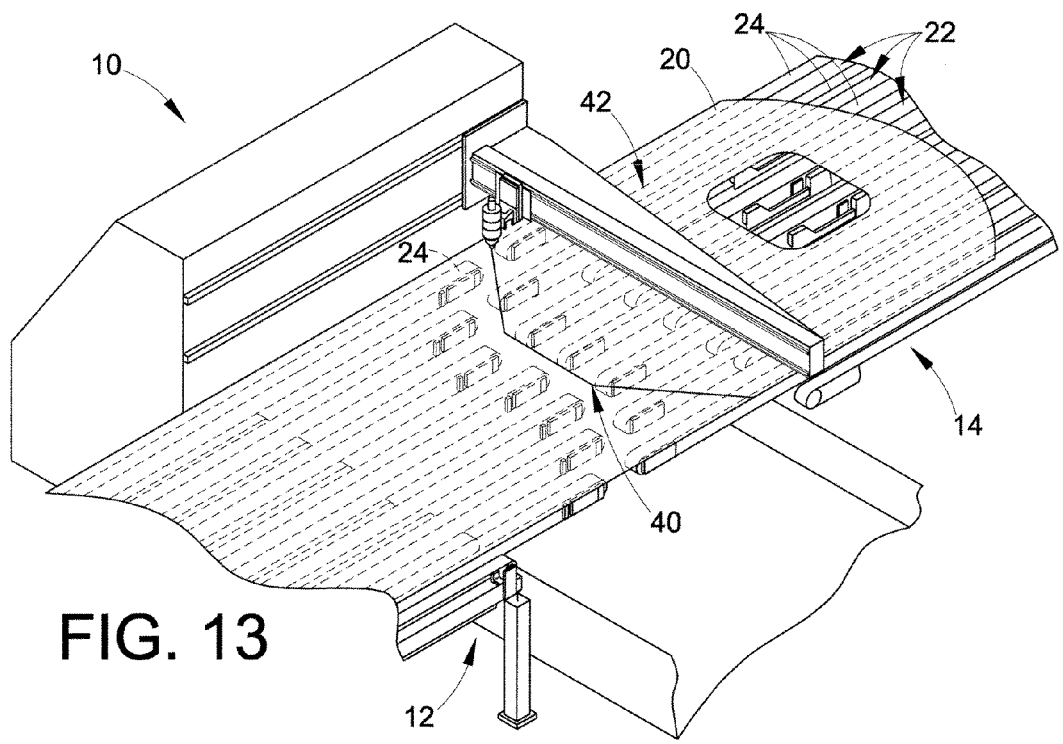
Figure 14:
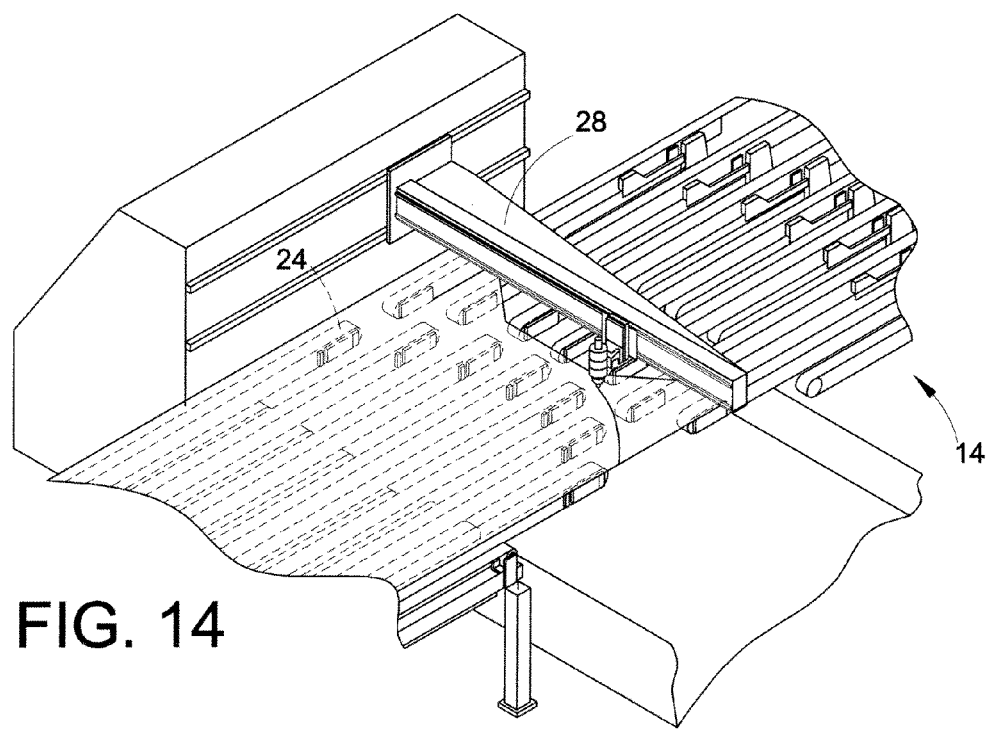

FIG. 13 is illustrative of completion of the third cut 40 being made. Completion of the third cut 40 results in severing the blank 42 from the strip of material 20. The support conveyors 22 of the second series 14 drives the blank 42 out of the laser cutting station 10 after it is separated from the strip 20. The belts 24 of the second series 14 activate to move the blank 42 downstream along the conveyor system 10 to stacking equipment (not shown). The belts 24 of the first series 12 remain inactive as the belts of the second series 14 drive the blank 40 downstream until there is at least a space formed between the blank and the new front end of the strip 20. The process then repeats itself, as is shown initiating in FIG. 14.

In another embodiment, the belts 24 of the first series 12 can move at a first velocity to advance the strip while the belts of the second series 14 can move at a second velocity to stack the blank. It is contemplated that in this instance the second velocity is greater than the first velocity. Simultaneously or at a conclusion of the belt movements, the individual support conveyors 22 can adjust for the first cut to be repeated for a second blank to be formed from the strip of material 20.

There are various modes of operating the present laser blanking device 10 to achieve the functions disclosed herein. All of the functions described for various components of the device 10, i.e. the support conveyors 22, the laser 26, the transverse-axis component 28, etc. can be conducted statically, dynamically, or in combination of both. The support conveyors 22 of the first conveyor series 12 are driven depending on the part that is required to be run. That is, in a multiple feed or a continuous feed operation, there can be an instance when performance of the laser cutting operation can be enhanced by enabling the support conveyors 22 on the first series 12 to drive material through the process.

In a first mode, referred to herein as a "static single feed mode", the support conveyors 22 move to a static location prior to processing the part for a static single feed. The support conveyors 22 more specifically move to the static or stationary location before the production run is initiated. That is, the support conveyors 22 neither extend nor retract during the production run for forming multiple blanks. Generally, the production run for the first mode produces multiple, identical blanks. Additionally, the coil processing line feeds a consistent length of stock material 20. A blanking or cutting routine is performed on the material 20 to part cuts from the blank or to sever a developed blank 42 from the strip 20. During the laser cutting routine, i.e., the period of which the laser head generates a laser beam and focuses the beam on the material 20, the support conveyors 22 remain static. After the developed blank 42 is parted from the strip 20, the pinch roller 18 and/or the belts 24 of the support conveyors 22 are then reactivated to index another feed. The length of this next feed is equal to a length of the first feed in the previous sequence. The sequence is repeated for each part that is produced. One aspect of the first mode is that a complete blank is formed with only one indexing of the strip of material 20. In other words, there is only one index forward of material for each blank formed such that the blank can be parted from a forward end of the strip 20. Furthermore, while each blank is formed, there is no forward extension or rearward retraction of any one support conveyor 22.

Depending on the particular profile of the blank, additional or fewer cuts operations are needed to form the blank. Subsequent processes can run the same cut routines, different cut routines, or alternate between the two. Similarly, if multiple cut-outs are included inside perimeters of each developed blank 42, the strip 20 is advanced to positions where the laser blanking system 10 can cut various sized perforations in the blanks. A second mode of operation includes multiple feeds and multiple cuts made per each one blank. The additional cuts cannot be accomplished without at least a second indexing of the strip material 20. The belts 24 activate to advance the strip 20 in measured lengths but deactivate for each cut made to the strip per blank.

In the second mode, called the "static multiple feed mode", the support conveyors 22 move to a static location prior to processing the part formed with multiple feeds. The support conveyors 22 more specifically move to the static or stationary location before the production run is initiated. That is, the support conveyors 22 neither extend nor retract during the production run for forming multiple blanks. Generally, the production run for the second mode produces multiple blanks, wherein each one blank formed can be identical or not identical to the preceding blank formed. However, to produce each one blank, the coil processing line feeds at least two lengths of stock material 20. Each of the at least two index lengths may be equal. In other embodiments, each of the at least two index lengths may be unequal. A last of the at least two indexes is utilized for parting the blank or severing a developed blank 42 from the strip 20. At least one of the at least two index lengths may be utilized to position a region of the stock material 20 under the laser head 26 for additional cuts in the blank, such as, for example, an aperture, etc., formed through the blank. During the laser cutting routine, i.e., the period of which the laser head generates a laser beam and focuses the beam on the material 20, the support conveyors 22 remain static. After the developed blank 42 is parted from the strip 20, the pinch roller 18 and/or the belts 24 of the support conveyors 22 are then reactivated to index another feed. The length of this next feed is equal to a length of the first feed in the previous sequence. The sequence is repeated for each part that is produced. One aspect of the second mode is that a complete blank is formed with multiple indexing of the strip of material 20. In other words, there is multiple indexes forward of material for each blank formed before the blank can be parted from a forward end of the strip 20. Furthermore, while each blank is formed, there is no forward extension or rearward retraction of any one support conveyor 22.

A third mode of operation, referred to herein as a "dynamic single feed mode", is directed toward movement of the support conveyors 22 to preset locations. The coil processing line feeds the stock material 20 a consistent feed length. After the feeding step is complete, the laser cutting system 10 runs a cutting routine that cuts and separates a developed blank from the strip 20. Simultaneous to the laser cutting routine, i.e., the support conveyors 22 adjust positions to continually provide clearance for the laser in regions of the laser beam and to provide support to the strip material and/or blank in regions outside that of the laser beam. The coil processing line indexes another feed after the blank 42 is severed from the strip of material 20. The length of the feed is equal to that of the previous feed. After the feed is complete, the cutting routine is repeated. This sequence repeats for each blank produced.

More specifically, in the third mode, the support conveyors 22 can and/or continue to extend and/or retract during the production run for forming multiple blanks. Generally, the production run for the third mode produces multiple blanks, wherein each one blank formed can be identical or not identical to the preceding blank formed. However, the coil processing line feeds a consistent length of stock material 20 with each indexing. A blanking or cutting routine is performed on the material 20 to cut parts 38 from the blank or to sever a developed blank 42 from the strip 20. During the laser cutting routine, i.e., the period of which the laser head generates a laser beam and focuses the beam on the material 20, the support conveyors 22 may move. After the developed blank 42 is parted from the strip 20, the pinch roller 18 and/or the belts 24 of the support conveyors 22 are then reactivated to index another feed. The length of this next feed is equal to a length of the first feed in the previous sequence. The sequence is repeated for each part that is produced. One aspect of the third mode is that a complete blank is formed with only one indexing of the strip of material 20. In other words, there is only one index forward of material for each blank formed such that the blank can be parted from a forward end of the strip 20. Furthermore, while each blank is formed, there is forward extension or rearward retraction of at least one support conveyor 22. Depending on the blank being formed, additional indexing operations may be required to complete the blank before it is parted from a forward end of the strip 20.

In a fourth mode of operation, referred to herein as the "dynamic multiple feed mode", the support conveyors 22 move during processing a part formed with multiple feeds. The support conveyors 22 extend or retract during a production run for forming multiple blanks. Generally, the production run for the third mode produces multiple blanks, wherein each one blank formed can be identical or not identical to the preceding blank formed. However, to produce each one blank, the coil processing line feeds at least two lengths of stock material 20. In one embodiment, each of the at least two index lengths may be equal. In other embodiments, each of the at least two index lengths may be unequal. A last of the at least two indexes is utilized for parting the blank or severing a developed blank 42 from the strip 20. At least one of the at least two index lengths may be utilized to position a region of the stock material 20 under the laser head 26 for additional cuts in the blank, such as, for example, an aperture, etc., formed through the blank. During the laser cutting routine, i.e., the period of which the laser head generates a laser beam and focuses the beam on the material 20, at least one support conveyors 22 extends or retracts. After the developed blank 42 is parted from the strip 20, the pinch roller 18 and/or the belts 24 of the support conveyors 22 are then reactivated to index another feed. The length of this next feed is equal to a length of the first feed in the previous sequence. The sequence is repeated for each part that is produced. One aspect of the fourth mode is that a complete blank is formed with multiple indexing of the strip of material 20. In other words, there is multiple indexes forward of material for each blank formed before the blank can be parted from a forward end of the strip 20. Furthermore, while each blank is formed, there forward extension or rearward retraction of at least one support conveyor 22.

In a fifth mode, referred to herein as a "static continuous feed mode", the support conveyors 22 move to a static location prior to processing the part for a static single feed. The support conveyors 22 more specifically move to the static or stationary location before the production run is initiated. That is, the support conveyors 22 neither extend nor retract during the production run for forming multiple blanks. Generally, the production run for the first mode produces multiple, identical blanks, wherein each one blank can be identical to or not identical to a preceding blank. Additionally, the pinch roller 18 and/or the belts 24 of the support conveyors 22 continually feed the stock material 20. A blanking or cutting routine is performed on the material 20 to part cuts from the blank or to sever a developed blank 42 from the strip 20 as the stock material is continually fed downstream. During the laser cutting routine, i.e., the period of which the laser head generates a laser beam and focuses the beam on the material 20, the support conveyors 22 remain static. The sequence of cuts may be repeated for each part that is produced. One aspect of the fifth mode is that a complete blank is formed during continuous indexing of the strip of material 20. In other words, there is no start and stop of the strip of material 20 for each blank formed such that the blank can be parted from a forward end of the strip 20. Rather, the blank is parted as the strip of material continues downstream at a constant velocity. Furthermore, while each blank is formed, there is no forward extension or rearward retraction of any one support conveyor 22.

In a sixth mode, referred to herein as a "dynamic continuous feed mode", the support conveyors 22 move during processing of parts for a static single feed. At least one support conveyor 22 extends or retracts during the production run for forming multiple blanks. Generally, the production run for the first mode produces multiple, identical blanks, wherein each one blank can be identical to or not identical to a preceding blank. Additionally, the pinch roller 18 and/or the belts 24 of the support conveyors 22 continually feed the stock material 20. A blanking or cutting routine is performed on the material 20 to part cuts from the blank or to sever a developed blank 42 from the strip 20 as the stock material is continually fed downstream. During the laser cutting routine, i.e., the period of which the laser head generates a laser beam and focuses the beam on the material 20, at least one support conveyor 22 extends or retracts while the stock material is continuously moving. The sequence of cuts may be repeated for each part that is produced. One aspect of the sixth mode is that a complete blank is formed during continuous indexing of the strip of material 20. In other words, there is no start and stop of the strip of material 20 for each blank formed such that the blank can be parted from a forward end of the strip 20. Rather, the blank is parted as the strip of material continues downstream at a constant velocity. Furthermore, while each blank is formed, at least one support conveyor forwardly extends or rearwardly retracts.

The disclosure is not limited to the foregoing modes. Other modes are contemplated, including a continuous feed of strip material is driven while cuts are made to the material. Each mode is programmed into a controller that is operatively associated with all components of the laser blanking system 10. Furthermore, the specifications of the blank to be produced are programmed into the controller. The controller is operable to control and time activations, deactivations, and synchronize movements of the various components (pinch rollers, belts, adjustments, lasers, cranes, etc.) of the laser blanking system 10 such that the customized blank is produced while utilizing minimal floor space, minimal costs, and maximum time efficiency.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A laser blanking system for cutting a blank from a stock material, comprising:
   a laser cutting station comprising a laser moveable along both a longitudinal axis of the system and a transverse axis of the system;
   a plurality of first support conveyors extending along the longitudinal axis of the system and being arranged adjacent to one another along the transverse axis of the system in a substantially parallel, spaced-apart relationship, the first support conveyors each being linearly extensible and retractable along the longitudinal axis of the system independently from one another, the first support conveyors being located on an upstream side of the laser cutting station;
   a plurality of second support conveyors extending along the longitudinal axis of the system and being arranged adjacent to one another along the transverse axis of the system in a substantially parallel, spaced-apart relationship, the second support conveyors each being linearly extensible and retractable along the longitudinal axis of the system independently from one another, the second support conveyors being located on a downstream side of the laser cutting station; and
   a controller for operatively controlling the extension and retraction of each of the first and second support conveyors and the movement of the laser.

2. The laser blanking system of claim 1, wherein the controller operatively controls the movement of each of the first and second support conveyors to match a two-dimensional profile portion of the blank being cut from the stock material.

3. The laser blanking system of claim 2, wherein each of the second support conveyors comprises a conveyor belt which moves in a recurring loop along the longitudinal axis of the system, and wherein each of the first and second support conveyors continuously or intermittently retract and extend to adjust a conveyor surface of the system.

4. The laser blanking system of claim 3, wherein movement of the conveyor belts is controlled to index feed a specific length of stock material.

5. The laser blanking system of claim 4, wherein a velocity of the belts is substantially equal to a velocity of the stock material traveling along the system.

6. The laser blanking system of claim 3, wherein movement of the conveyor belts is suspended when a laser beam cuts the associated stock material.

7. The laser blanking system of claim 3, wherein each of the first and second support conveyors comprises a conveyor belt which moves in a recurring loop along the longitudinal axis of the system, wherein the conveyor belts of the first support conveyors move substantially at a same first velocity, and wherein the conveyor belts of the second support conveyors move substantially at a same second velocity.

8. The laser blanking system of claim 7, wherein the first velocity is substantially equal to said second velocity.

9. The laser blanking system of claim 7, wherein the first velocity is different from said second velocity.

10. The laser blanking system of claim 1, wherein each of the first support conveyors opposes a corresponding one of the second support conveyors.

11. The laser blanking system of claim 10, wherein the controller controls the movement of a plurality of corresponding first and second support conveyors in order to match at least a portion of a two-dimensional profile of the blank being cut from the stock material.

12. The laser blanking system of claim 10, wherein the controller operatively controls the extension and retraction of each of the first and second support conveyors such that at least one first support conveyor is extended or retracted and at least one second support conveyor is retracted or extended in order to simultaneously support the stock material and create an opening therebetween for the laser to cut through the stock material.

13. The laser blanking system of claim 10, wherein the controller operatively controls the extension and retraction of each of the first and second support conveyors such that more than one first support conveyor is extended or retracted and more than one second support conveyor is retracted or extended in order to simultaneously support the stock material and create an opening therebetween for the laser to cut through the stock material.

14. The laser blanking system of claim 10, wherein the controller operatively controls the extension and retraction of each of the first and second support conveyors such that more than one first support conveyor is extended or retracted and more than one second support conveyor is retracted or extended in order to create an opening therebetween to allow scrap to fall from the stock material.

15. The laser blanking system of claim 2, wherein the laser cutting station further comprises a multiple-axis gantry system comprising a longitudinal axis component situated adjacent to the first and second support conveyors and a transverse-axis component supported by and moveable along the longitudinal axis component, wherein the laser is supported by and moveable along the transverse-axis component.

16. The laser blanking system of claim 9, wherein when the blank is cut from the stock material the first velocity is 0 meters/second and the second velocity is greater than 0 meters/second, wherein the conveyor belts of the second support conveyors carry the blank downstream of the laser cutting station.

17. The laser blanking system of claim 13, wherein the laser reciprocally moves along a longitudinal axis of the transverse-axis component and the transverse-axis component reciprocally moves along the longitudinal axis of the longitudinal-axis component, and wherein the controller operatively controls the simultaneous movement of the transverse-axis component and the laser to cause the laser to follow the two-dimensional profile portion of the blank.

18. The laser blanking system of claim 14, further including a scrap conveyor positioned below the first and second support conveyors to collect and carry away scrap cut from the stock material.

19. A laser blanking system for a cutting blank from a strip of coil stock material as the strip moves forward through the system, the system comprising:

a first pinch roll assembly located adjacent to an upstream end of the system, the first pinch roll assembly feeding the strip of the coil stock material in a downstream direction onto a first series of conveyors;

the first series of conveyors comprising a plurality of individual first support conveyors extending along the longitudinal axis of the system and being arranged adjacent to one another along the transverse axis of the system in a substantially parallel, spaced-apart relationship, the first support conveyors each being linearly extensible and retractable along the longitudinal axis of the system independently from one another, the first series of conveyors moving the strip of coil stock material downstream to a laser cutting station;

the laser cutting station comprising a laser moveable along both a longitudinal axis of the system and a transverse axis of the system and a multiple-axis gantry system comprising a longitudinal axis component situated adjacent to the first series of conveyors and a transverse-axis component supported by and moveable along the longitudinal axis component, wherein the laser is supported by and moveable along the transverse-axis component;

a second series of conveyors comprising a plurality of second support conveyors extending along the longitudinal axis of the system and being arranged adjacent to one another along the transverse axis of the system in a substantially parallel, spaced-apart relationship, the second support conveyors each being linearly extensible and retractable along the longitudinal axis of the system independently from one another, the second series of conveyors being located on a downstream side of the laser cutting station such that each of the first support conveyors opposes a corresponding one of the second support conveyors; and a controller for operatively controlling the movement of the first and second support conveyors and the movement of the laser, wherein a plurality of corresponding first and second support conveyors are positioned to match at least a portion of a two-dimensional profile of the blank and create an opening therebetween, and wherein the laser follows the two-dimensional profile of the blank.

20. The laser blanking system of claim 19, wherein the controller operatively controls the extension and retraction of each of the first and second series of conveyors such that more than one first support conveyor is extended or retracted and more than one corresponding second support conveyor is retracted or extended in order to create an opening therebetween to allow scrap to fall from the stock material.

* * * * *

UNITED STATES PATENT AND TRADEMARK OFFICE
CERTIFICATE OF CORRECTION

PATENT NO. : 8,471,175 B2
APPLICATION NO. : 12/690418
DATED : June 25, 2013
INVENTOR(S) : Jay G. Finn Page 1 of 1

It is certified that error appears in the above-identified patent and that said Letters Patent is hereby corrected as shown below:

In the Specification

In Col. 13, Line 63, Claim 6, after "the", delete "associated".

Signed and Sealed this
Twentieth Day of August, 2013

Teresa Stanek Rea
*Acting Director of the United States Patent and Trademark Office*